United States Patent [19]
Kohama et al.

[11] Patent Number: 5,157,833
[45] Date of Patent: Oct. 27, 1992

[54] METHOD FOR MANUFACTURING TAPE GUIDE FOR USE IN DATA CARTRIDGE

[75] Inventors: Takayuki Kohama; Minoru Kida, both of Yokohama, Japan

[73] Assignee: Sanshin Industry Co., Ltd., Yokohama, Japan

[21] Appl. No.: 859,130

[22] Filed: Mar. 27, 1992

[30] Foreign Application Priority Data

Mar. 30, 1991 [JP] Japan .................................. 3-93466

[51] Int. Cl.⁵ ...................... B21B 31/08; B60B 5/00
[52] U.S. Cl. .................................. 29/895.2; 29/895.3; 29/895.33; 29/527.4; 29/132
[58] Field of Search .............. 29/895.2, 895.3, 895.32, 29/895.33, 527.2, 527.4, 530, 525, 557, 558, 132, 806; 206/387; 360/132; 726/196, 197

[56] References Cited

U.S. PATENT DOCUMENTS

| | | |
|---|---|---|
| 827,689 | 7/1906 | Francis .......................... 29/895.3 X |
| 2,059,384 | 11/1936 | Montgomery et al. .......... 29/895.32 |
| 4,437,222 | 3/1984 | Umehara ....................... 29/527.4 |
| 4,800,641 | 1/1989 | Gelardi et al. ......................... 29/436 |

Primary Examiner—Timothy V. Eley
Attorney, Agent, or Firm—Brown, Martin, Haller & McClain

[57] ABSTRACT

A guide pin-manufacturing method includes the steps of plating a stepped cylindrical main portion (which is formed of brass or another non-magnetic material) with a hard, thick chromium plating layer by rotating the main portion in a plating liquid, forming a large number of minute grooves in the entire surface of the main body such that the grooves extend in the circumferential direction of the main body, and forcibly fitting two collars around the respective ends of the main portion. By execution of these steps, a guide pin to be arranged inside a data cartridge is manufactured. The guide pin arranged in the data cartridge guides the magnetic tape such that the magnetic tape travels in a stable manner.

8 Claims, 4 Drawing Sheets

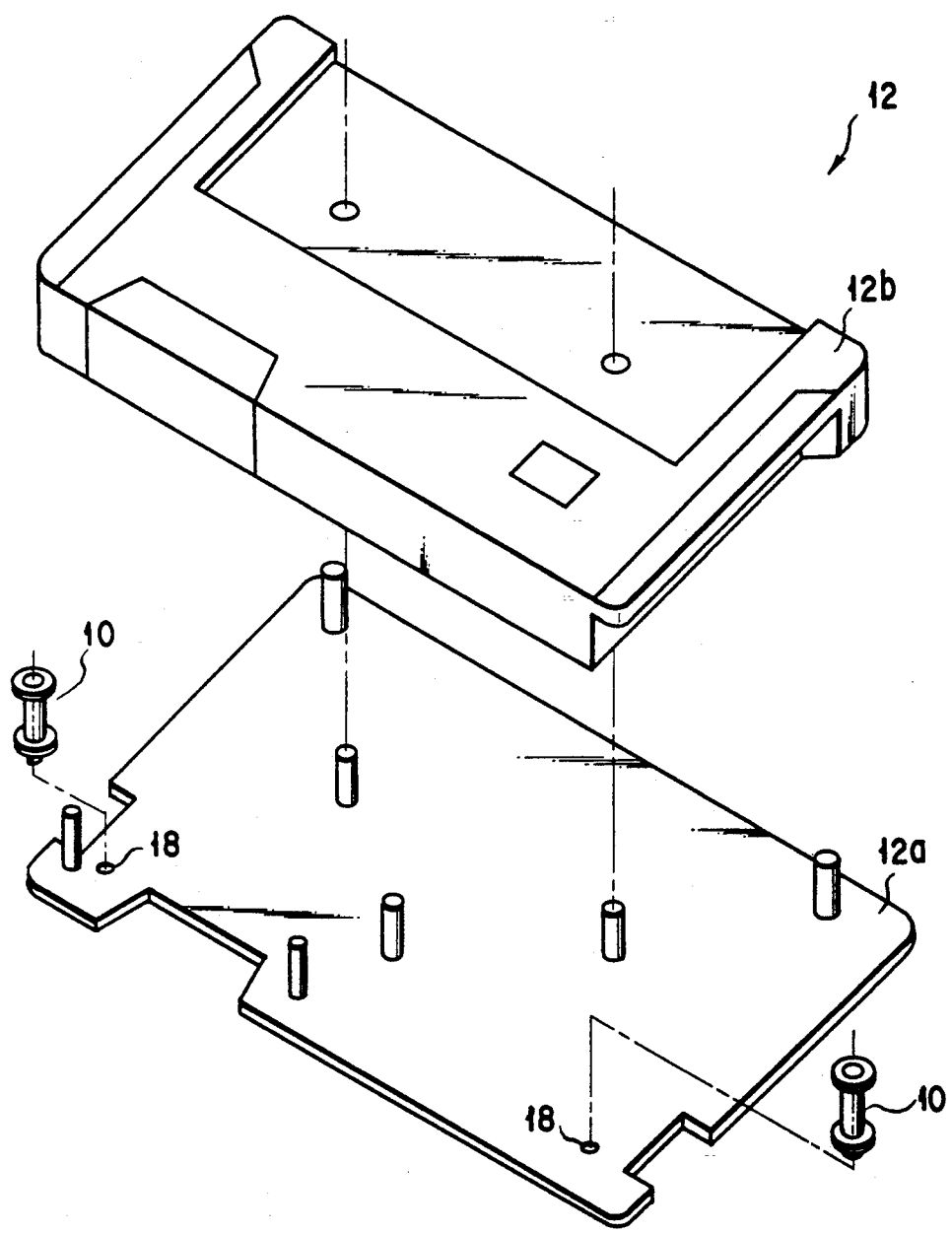
F I G. 1

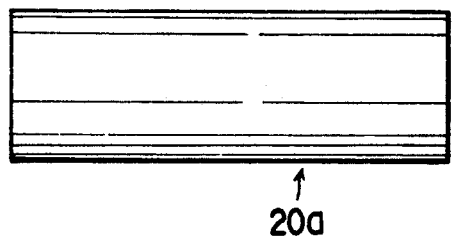
FIG. 4
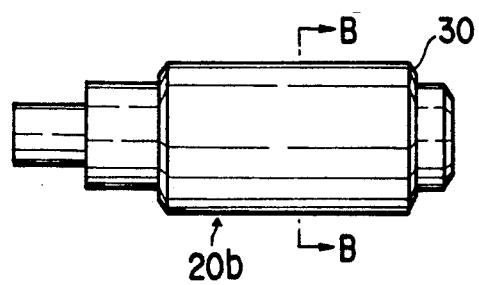 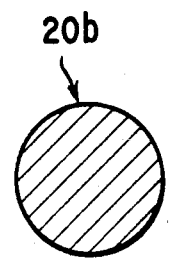
FIG. 5A   FIG. 5B
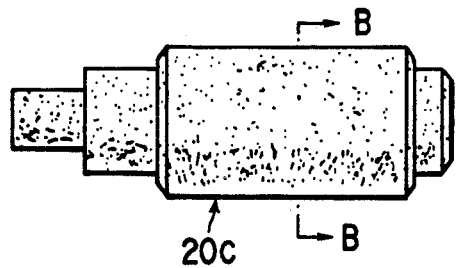 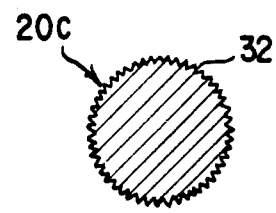
FIG. 6A   FIG. 6B
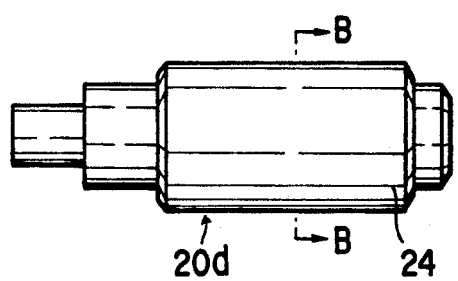 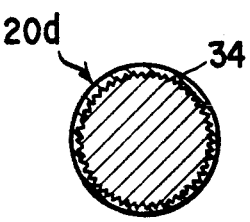
FIG. 7A   FIG. 7B

METHOD FOR MANUFACTURING TAPE GUIDE FOR USE IN DATA CARTRIDGE

BACKGROUND OF THE INVENTION

1. Field of the Invention

The present invention relates to a method for manufacturing a tape guide employed for guiding the magnetic tape of a data cartridge, i.e., an external memory device of a computer.

2. Description of the Related Art

A conventional tape guide employed for guiding the magnetic tape of a data cartridge comprises a cylindrical portion for guiding the surface of the tape; and collar portions integral with the cylindrical portion and located at the respective axial ends of the cylindrical portion. The tape guide is made by working a cylindrical blank formed of a very hard stainless steel. The blank is first worked to have a predetermined shape and size by means of an ND lathe, and is then subjected to barrel finishing, quenching, diamond lapping, to thereby obtain a stepped pin to be used as a tape guide. After being subjected to heat treatment, the tape guide is provided with a hardness of approximately HV 500. The reason for using a very hard material as the material of the tape guide is prevent the magnetic tape from being scratched. (If the surface of the tape guide is not hard but soft, the magnetic tape is likely to be scratched.)

As described above, the conventional tape guide is made by working a blank formed of a stainless steel. In general, a stainless steel is hard to work, and the stainless steel used as the material of the blank is very hard, as mentioned above. Thus, the material cost of the blank is inevitably high, and the blank cannot be worked with ease. In addition, the conventional tape guide has a complicated shape since, as mentioned above, it is comprised of a cylindrical portion and axial-end collar portions integral therewith. Due to the complicated shape, the polishing of the conventional tape guide is laborious work. Therefore, according to the conventional tape guide-manufacturing method, not only the material cost but also the working cost is high, thus increasing the overall manufacturing cost of the tape guide.

Accordingly, it is a principal object of the present invention to provide a tape guide-manufacturing method which solves the problems of the conventional method and which permits a high-quality tape guide for use in a data cartridge to be manufactured at low cost.

To achieve this object, the present invention provides a method for manufacturing a tape guide which is to be arranged inside a data cartridge so as to guide a magnetic tape contained in the data cartridge, the method comprising the steps of:

preparing a cylindrical blank which is formed of a non-magnetic material and has a predetermined length and a predetermined diameter, and with which the main portion of the tape guide is to be made;

forming a step on the blank, thereby obtaining a stepped blank having a large-diameter portion and small-diameter portions located at respective ends of the large-diameter portion;

forming fine irregularities on the entire surface of the stepped blank;

electrically plating the blank having the fine irregularities with chromium, by rotating the blank in a plating liquid containing chromium ions, the electrical plating step including a sub-step of maintaining the temperature of the plating liquid approximately in the range of 50° to 60° C., and a sub-step of maintaining the current density approximately in the range of 40 to 50 A/dm$^2$; and forming a large number of minute grooves at least in the entire large-diameter portion of the blank plated with chromium, in such a manner that the grooves extend in the circumferential direction of the blank.

A data cartridge's tape guide manufactured in the method of the present invention withstands long use. In addition, it can smoothly guide the magnetic tape of the data cartridge and can be manufactured at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic, exploded perspective view which shows tape guides according to an embodiment of the present invention, along with a data cartridge into which the tape guides are to be incorporated;

FIGS. 4 through 7B are views showing how the tape guide is worked in each step of the manufacturing method, FIGS. 5B, 6B and 7B being sectional views taken along lines B—B in FIGS. 5A, 6A and 7A, respectively;

DETAILED DESCRIPTION OF THE PREFERRED EMBODIMENTS

Figure 2:
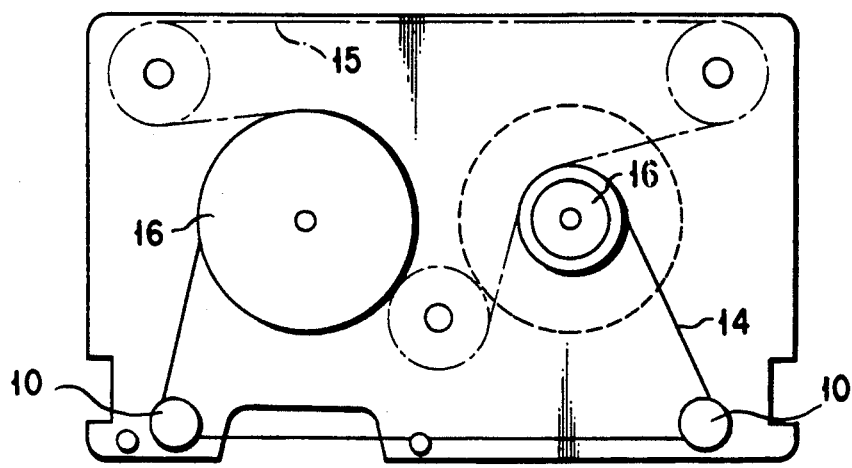
FIG. 2 is a view showing the relationships between the tape guides and the magnetic tape of the data cartridge.

As is shown in FIGS. 1 and 2, tape guides 10 according to an embodiment of the present invention are arranged inside a cartridge 12. The cartridge 12 is made up of a lower cover 12a and an upper cover 12b, and is a data cartridge employed as an external memory device of a computer. The size, shape and structure of the cartridge 12 can be determined in accordance with the use.

As is shown in FIGS. 1 and 2, the cartridge 12 has two reels 16 around which a magnetic tape 14 is wound. A pair of mounting holes 18 are formed in the lower cover 12a. The tape guides 10 are fitted in the respective mounting holes 18. The magnetic tape 14, which is driven by a drive belt 15, slides on the tape guides 10 and is guided thereby such that it is maintained at a constant level. The number of tape guides 10 employed can be determined on the basis of the structure or size of the data cartridge 12, and is two or three in normal cases.

Figure 3:
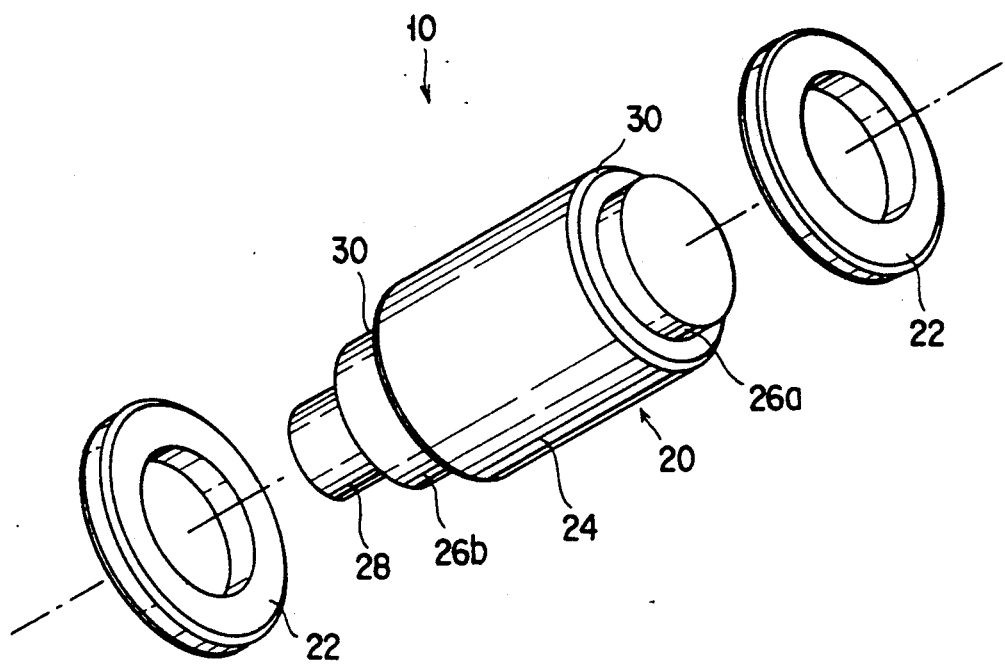
FIG. 3 is a schematic enlarged view showing an exploded state of a tape guide.

As is shown in FIG. 3, each tape guide 10 has a substantially cylindrical main portion 20. The main portion 20 is made up of: a large-diameter portion 24 located in the axial center thereof; intermediate-diameter portions 26a and 26b axially extending from the two ends of the large-diameter portion 24; and a small-diameter portion 28 axially extending from one (26b) of the intermediate-diameter portions. The magnetic tape 14 shown in FIG. 2 slides on the surface of the large-diameter portion 24. Collars 22, which are like circular plates having openings, are forcibly fitted around the respective intermediate-diameter portions 26a and 26b of the main portion 20. The small-diameter portion 28 is fitted in a mounting hole 18 (FIG. 1) of he lower cover 12a, so that the tape guide 10 is supported by the lower cover 12a.

The ends of the large-diameter portion 24 are chamfered, as indicated by "30" in FIG. 3. When the magnetic tape 14 slides on the surface of the large-diameter portion 24, the chamfered ends 30 prevent the tape 14 from being caught between the collars 22 and the large-diameter portion 24. In other words, the chamfered ends 30 protect the tape 14 from damage. It is desirable that the outer circumferences of the collars 22 be also chamfered, so as to protect the magnetic tape 14 from damage.

According to the embodiment, the length of the tape guide 10 (i.e., the length of the main portion 20) is about 11 mm, the diameter of the large-diameter portion 24 is about 4.75 mm, and the diameter of the small-diameter portion is about 3 mm. Intermediate-diameter portion 26b is longer than intermediate-diameter portion 26a in the embodiment, but the length of intermediate-diameter portions 26a and 26b may be arbitrarily determined in accordance with the vertical position at which the magnetic tape 14 should be guided inside the cartridge 12. Likewise, the length of large-diameter portion 24 may be arbitrarily determined in accordance with the width of the magnetic tape 14.

A description will now be given of the process in which the tape guide 10 mentioned above is manufactured.

First of all, a cylindrical blank 20a formed of a non-magnetic material (e.g., brass) is prepared, as is shown in FIG. 4. The blank 20a is formed of brass in the embodiment, but it may formed of any kind of non-magnetic material, such as aluminum or plastics, as long as industrial chromium plating (mentioned below) can be carried out with respect to the blank 20a. The reason why brass is adopted as the material of the blank 20a in the embodiment is that brass can be easily worked by cutting and that industrial chromium plating can be easily carried out with respect to the brass blank. The cylindrical blank 20a is subjected to pressing and machining steps, by which the blank 20a is worked by extrusion and cutting. As a result, a stepped cylindrical blank 20b, which looks like the completed main portion 20 shown in FIG. 3, is obtained.

FIGS. 5A and 5B show the stepped cylindrical blank 20b. As is shown in these Figures, it is desirable that the cylindrical blank 20b have chamfered portions 30. The blank 20b is subjected to pretreatment, by which rust, grease or oil is removed from the surface of the blank 20b and a large number of fine irregularities are formed on the surface. Where the blank 20b is formed of brass or a plastic material, the irregularities can be formed by etching. On the other hand, where the blank is formed of aluminum, the irregularities can be formed by oxidation.

FIGS. 6A and 6B show a blank 20c obtained by the pretreatment, i.e., a blank having a large number of fine irregularities 32 thereon. The reason for providing the blank with such irregularities is to permit a hard chromium plating layer 34 (which is to be formed in the subsequent step and shown in FIG. 7B) to be tightly bonded to the blank.

Next, the blank 20c is subjected to industrial chromium plating, i.e., hard chromium plating. In this plating step, the blank 20c is immersed in a plating liquid (e.g., a chromic acid solution) containing chromium ions and is rotated in the plating liquid. The temperature of the plating liquid is in the range of approximately 50° to 65° C. (preferably, in the range of 50° to 60° C.), and the current density thereof is in the range of approximately 30 to 95 A/dm$^2$ (preferably, in the range of 40 to 50 A/dm$^2$). According to the embodiment, the electric plating is carried out for 5–20 minutes, with the temperature of the plating liquid in the range of 50° to 60° C. and the current density in the range of 40° to 50° C. As a result, a hard chromium plating layer 34 having a thickness of about 15 $\mu$m is uniformly formed on the blank 20c, as is shown in FIGS. 7A and 7B. Needless to say, a thicker plating layer can be formed by carrying out the electric plating for a longer time. The thickness of the plating layer 34 is preferably within the range of 10 to 1–5 $\mu$m, and the hardness thereof is within the range of HV 900 to 1,000.

The reason for forming the hard chromium plating layer 34 is to protect the magnetic tape from damage. To be more specific, in the present invention, the material of the blank 20a (i.e., the main portion 20 of the tape guide) is soft and can be easily worked. (According to the embodiment, the material of the blank is brass, the hardness of which is HV 180.) However, such a soft material is likely to damage the magnetic tape sliding thereon. The hard chromium plating layer 34 employed in the present invention is effective in protecting the magnetic tape from damage.

As mentioned above, the hard chromium plating layer 34 has a hardness of more than HV 900, and is tightly bonded to the main body 20. Hence, the tape guide according to the present invention is improved in both anti-wear and anti-corrosion characteristics and ensures a very stable tape-guiding function, in comparison with the conventional tape guide formed of a stainless steel.

Figure 8:
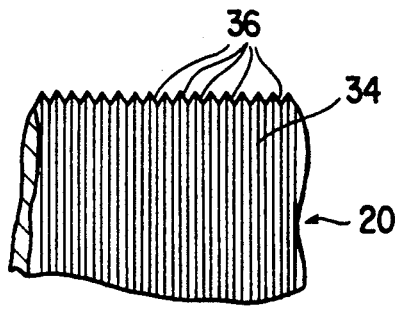
FIG. 8 is a view showing how collars are attached to a stepped pin.

If necessary, the blank 20c is subjected to post treatment, including washing and drying steps. After the post treatment, the hard chromium plating layer 34 of the blank 20c is polished by centerless grinding or barrel finishing, such that a large number of minute grooves 36 extending in the circumferential direction of the blank 20c are formed in the surface of the hard chromium plating layer 34, as is shown in FIG. 8. The reason for forming the minute grooves 36 is to ensure smooth sliding movement of the magnetic tape. To be more specific, when the magnetic tape slides on the surface of the large-diameter portion 24 of the tape guide 20, the air in the minute grooves 36 prevents the magnetic tape from adhering to the plating layer 34, thus ensuring the smooth sliding movement of the magnetic tape. As is shown in FIG. 7A, the chromium-plated blank 20c has a stepped section, so that the surface of the large-diameter portion 24 can be uniformly polished in the polishing step.

It is desirable that the surface roughness of the polished main portion 20 be within the range of 0.2 to 0.6 S (i.e., the maximum ridge height: 0.2 to 0.6 μmRmax). It is also desirable that the ridges between the adjacent grooves 36 be formed to be round by barrel finishing, so as to prevent the ridges to scratch the magnetic tape.

Figure 9:
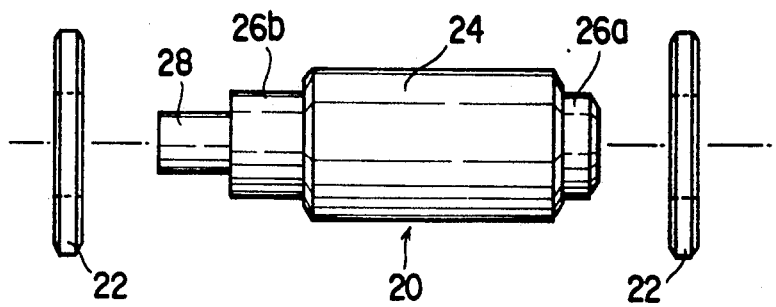
FIG. 9 is a view showing a completed state of tape guide.
Figure 10:
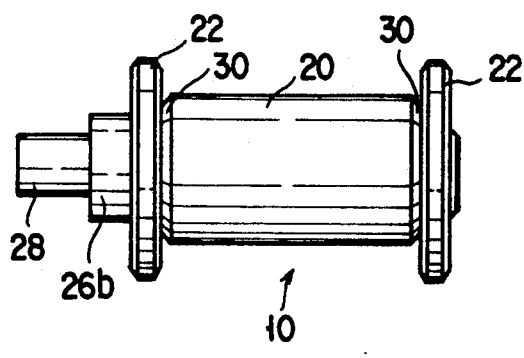
FIG. 10 is a schematic enlarged view showing the state of part of the surface of the tape guide depicted in FIG. 9.

As is shown in FIG. 9, two collars 22 obtained, for example, by press-working an ordinary stainless steel, are forcibly fitted around the intermediate-diameter portions 26a and 26b, respectively. FIG. 10 shows a tape guide 10 in the state where the collars 22 are assembled to the main portion 10.

Experiments were conducted by the applicant, with the tape guide 10 manufactured in the above manner being actually applied to a recording/reproduction apparatus. The experiments showed that the tape guide 10 could guide the magnetic tape in a stable manner without causing any damage to the magnetic tape.

The main portion 20 of the tape guide 10 according to the present invention is formed of a non-magnetic material (e.g., brass) that can be plated with chromium. Thus, the material cost of the tape guide 10 is very low; it is ½ to ⅓ of the material cost of the conventional tape guide formed of a special-kind of stainless steel. In addition, the tape guide 10 according to the present invention can be manufactured at low cost, since the quenching step as required in the prior art is not necessary. Moreover, since the hard chromium plating layer 34 can be formed uniformly, the tape guide 10 is of high quality, ensures good productivity, and can be polished uniformly.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for manufacturing a tape guide which is to be arranged inside a data cartridge so as to guide a magnetic tape contained in the data cartridge, said method comprising the steps of:

preparing a cylindrical blank which is formed of a non-magnetic material and has a predetermined length and a predetermined diameter, and with which a main portion of the tape guide is to be made;

forming a step on the blank, thereby obtaining a stepped blank having a large-diameter portion and small-diameter portions located at respective ends of the large-diameter portion;

forming fine irregularities on the entire surface of the stepped blank;

electrically plating the blank having the fine irregularities with chromium, by rotating the blank in a plating liquid containing chromium ions, said electrical plating step including a sub-step of maintaining the temperature of the plating liquid approximately in the range of 50° to 60° C., and a sub-step of maintaining the current density approximately in the range of 40 to 50 A/dm$^2$; and forming a large number of minute grooves at least in the entire large-diameter portion of the chromium-plated blank, in such a manner that the grooves extend in a circumferential direction of the blank.

2. A method according to claim 1, wherein, in said electrical plating step, the blank is kept immersed in the plating liquid for about 15 to 20 minutes, such that a chromium plating layer having a thickness in the range of approximately 10 to 15 μm is formed on the blank.

3. A method according to claim 1, wherein, in said electrical plating step, a hard chromium plating layer having a surface hardness in the range of HV 900 to 1,000 is formed.

4. A method according to claim 1, wherein said non-magnetic material is brass.

5. A method according to claim 1, wherein said non-magnetic material is aluminum, and said fine irregularities-forming step includes a sub-step of oxidizing the stepped blank.

6. A method according to claim 1, wherein said non-magnetic material is plastic, and said fine irregularities-forming step includes a sub-step of etching the stepped blank.

7. A method according to claim 1, further comprising the steps of:

preparing, by press working, collars which can be fitted around the small-diameter portions; and forcibly fitting the collars around the small-diameter portions.

8. A method according to claim 1, wherein said step-forming step includes a sub-step of forming a smallest-diameter portion which concentrically extends from one of the small-diameter portions.

* * * * *